(No Model.)

W. B. WRIGHT.
TRACTION DEVICE FOR TRAM CARS.

No. 468,860.  Patented Feb. 16, 1892.

Witnesses:
Celeste P. Chapman.
Davida J. Johnson.

Inventor:
Walter B. Wright.
By Francis W. Parker,
Attorney.

UNITED STATES PATENT OFFICE.

WALTER B. WRIGHT, OF CHICAGO, ILLINOIS.

TRACTION DEVICE FOR TRAM-CARS.

SPECIFICATION forming part of Letters Patent No. 468,860, dated February 16, 1892.

Application filed February 1, 1890. Serial No. 338,909. (No model.)

*To all whom it may concern:*

Be it known that I, WALTER B. WRIGHT, a citizen of the United States, and a resident of Chicago, in the county of Cook and State of Illinois, have invented a new and useful Improvement in Traction Devices for Tram-Cars, of which the following is a specification.

My invention relates to traction devices for tram-cars, and has for its object to provide means whereby the adhesion of the running-gear or traction-wheels of the car to the rails may be increased.

A certain application of my invention to tram-cars is illustrated in the accompanying drawings, wherein—

Figure 1:
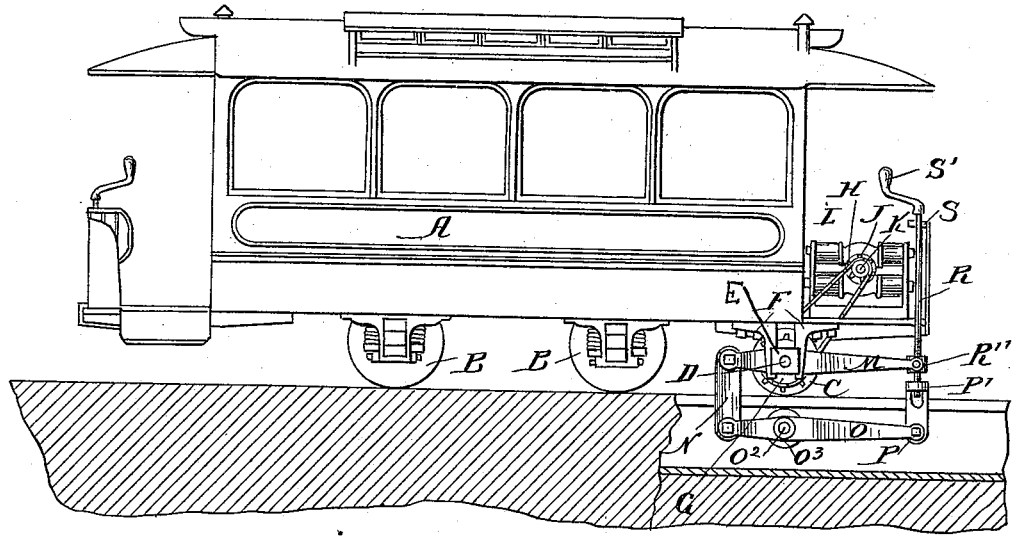
Figure 2:
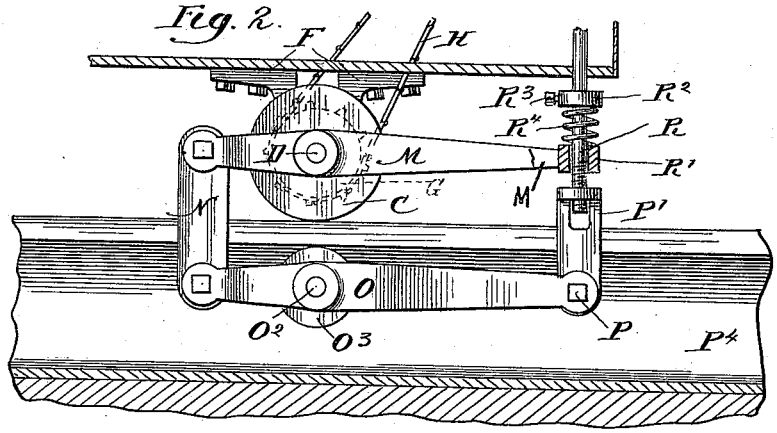
Figure 3:
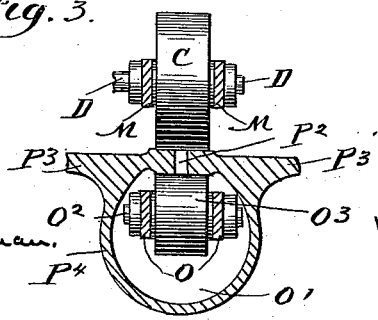

Figure 1 is a side view of a car with one form of my device attached, operating in conjunction with a dynamo on such car. Fig. 2 is an enlarged detail view with modification on section line. Fig. 3 is a detail cross-section.

Like parts are indicated by the same letter in all the figures.

A is the body of the car, in this case supported on the wheels B B.

C is a traction-wheel on the short axle D, which is supported in the bearings E E, so as to move somewhat vertically on the hangers F F. G is a sprocket-wheel upon the same axle driven by the drive-chain H from the sprocket-wheel J on the armature-shaft K of the dynamo L. M M are the arms of a yoke, in which is also journaled the axle D, and these arms are linked by the link N to similar arms O O within the channel O'. These arms support the short axle $O^2$, which carries the wheel $O^3$. At the forward ends of the arms O they are connected by the bolt P, to which is secured the link P', which passes up through the slot $P^2$ between the side sections $P^3$ $P^3$ of the conduit-pipe $P^4$. The upper end of this link P' is screw-threaded onto the rod R, upon which is the sliding collar R' and the fixed collar $R^2$, secured by a set-screw $R^3$, and a spring $R^4$ between the collars R' and $R^2$. To the collar $R^2$ is secured the forward ends of the arms M M. The collar R' is free to slide upon the rod R, and the rod R is screw-threaded into the upper end of the link P', and the links N and P' are of such size and shape as to freely pass through the slot $P^2$. The rod R, as shown in Fig. 1, is screw-threaded in opposite directions, one screw-thread being received into the upper end of the link P'. The other screw-threaded portion is received into the block R'', which is a screw-threaded and thus modified form of the block R'. The rod R passes upward through the bottom of the car and through the guide S and terminates in the handle S'.

It is verily understood that these parts could be greatly altered without departing from the spirit of my invention, and I have even devised forms in which the parts are located nearer the center of the car, and also parts in which the traction-wheel C is dispensed with and the upward pressure of the lower roller $O^3$ or like device is made to clamp the running-gear of the car; but the illustration offered is sufficient to show the general idea and also to suggest such modifications and applications as might be necessary to adapt the device to various circumstances and situations.

The use and operation of my invention are as follows: It is found that in the case of light cars, such as tram and street cars in which the propelling power located upon the car is employed, the weight of the car is not sufficient to cause the desired degree of adhesion of the running-gear to the supporting-track. Particularly is this deficiency remarked in the event of heavy grades and slippery tracks being encountered. Where cable lines and horse-power or heavy locomotives are employed, these difficulties are not so sensibly felt; but in the case of tram-cars propelled by electric motors thereon such difficulties have been found to create great obstacles to successful operation. In my device I preferably employ an independent traction-wheel, because I have shown it as applied to a use in connection with a conduit, such as are usually employed in cable railways; but, as above explained, the use of this independent traction-wheel is not indispensable to my device, as either similar wheels located otherwise might be employed, or the running-gear of the car itself would serve as such traction-wheel. The motor here illustrated as an electric motor is driven by the electric current in any desired and convenient manner and the power applied in any desired manner. Of course the motor will be provided with the usual controlling devices, so that any given normal speed could be regularly and constantly applied to the traction-wheel. This wheel itself will perhaps normally run upon the track; but the degree with which it adheres to such track or the pressure with which it is applied to the same will be determined by the manipulation of the handle S', for if such handle be turned in the proper direction, by reason of its oppositely-threaded portions engaging the oppositely-threaded portions of the block R'' and link P', the arms with which they are connected—that is, the arms O and M—will be brought together, and the two wheels $O^3$ and C will clamp the rail on opposite sides. The lower wheel $O^3$ in practice would perhaps be given a more rigid support than would be indicated or suggested in the drawings herewith presented. As the car reaches an incline or a portion of the track peculiarly slippery, by turning the handle S' the wheels $O^3$ and C could be caused to more strongly clasp the track, and hence their adhesion to the track be increased. By the devices shown in Fig. 2 the same result is accomplished. By the upper movement of the forward ends of the arms O the spring $R^4$ is forced against the movable collar and has the effect of producing an elastic cushion to ease the grip of the two wheels upon the rail.

Having thus described my invention, what I claim, and desire to secure by Letters Patent, is as follows:

The combination of a tram-car with a motor situated thereon, a traction-wheel driven by such motor, a compression-wheel situated on the opposite side of the rail on which the traction-wheel runs, levers carrying such wheels, said levers linked together at one end and at the other end connected by a connection of adjustable length, and means on the car for adjusting its length, thus to vary the adhesion of the traction-wheel to the rail.

Chicago, January 27, 1890.

WALTER B. WRIGHT.

Witnesses:
FRANCIS W. PARKER,
CELESTE P. CHAPMAN.